United States Patent [19]

Heckethorn

[11] 4,249,759
[45] Feb. 10, 1981

[54] U-BOLT CLAMP

[75] Inventor: John E. Heckethorn, Dyersburg, Tenn.

[73] Assignee: Heckethorn Manufacturing Company, Dyersburg, Tenn.

[21] Appl. No.: 1,738

[22] Filed: Jan. 8, 1979

Related U.S. Application Data

[63] Continuation-in-part of Ser. No. 868,798, Jan. 12, 1978, Pat. No. 4,147,384.

[51] Int. Cl.³ .............................................. F16L 13/14
[52] U.S. Cl. ................................. 285/382.2; 285/420; 24/277
[58] Field of Search ............... 24/277, 278; 285/382.2, 285/420, 197, 198, 199, 180

[56] References Cited

U.S. PATENT DOCUMENTS

| | | | |
|---|---|---|---|
| 1,727,896 | 9/1929 | Mraz | 285/382.2 X |
| 1,831,641 | 11/1931 | Skinner | 285/197 |
| 2,719,345 | 10/1955 | Riker | 24/277 |
| 3,955,250 | 5/1976 | Heckethorn | 24/277 |
| 3,984,134 | 10/1976 | Engman | 285/382.2 |
| 4,040,152 | 8/1977 | Gilgallon | 24/277 |
| 4,122,586 | 10/1978 | Nothdurft | 24/277 |

Primary Examiner—Dave W. Arola
Attorney, Agent, or Firm—Dennison, Meserole, Pollack & Scheiner

[57] ABSTRACT

A clamp for securing together in locked relationship a pair of telescoped pipes or tubes. The clamp consists of a novel U-bolt having a small radius portion, two outwardly diverging tapered sections and two parallel threaded arms, and a novel saddle member having a semicircular cut-out and being further chamfered adjacent the ends of the semicircular cut-out to define a greater diameter. The assembly when in its loading position will accept a pipe joint of greater outside diameter than the inner diameter of the tightened clamp; and wherein tightening of the clamp initially deforms the pipe joint into an ovaled configuration and impresses a bead thereabout for 360°.

3 Claims, 10 Drawing Figures

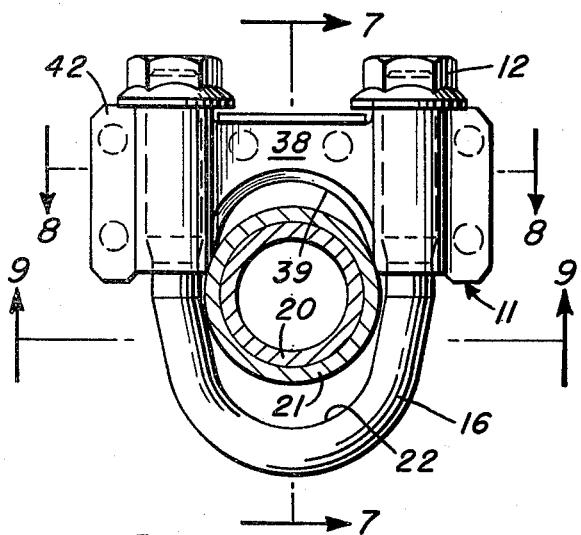
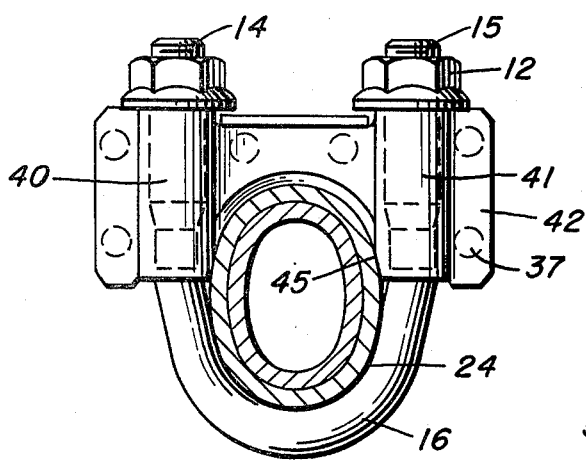
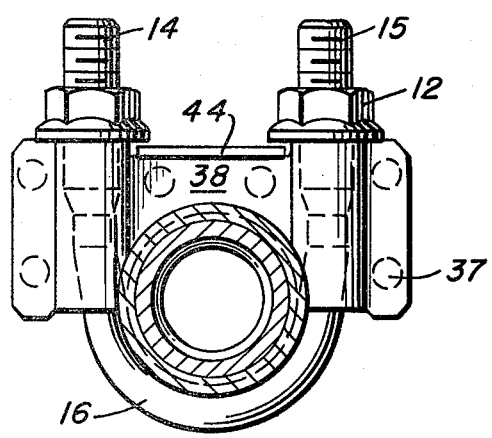
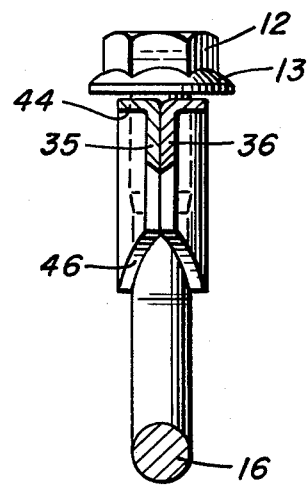
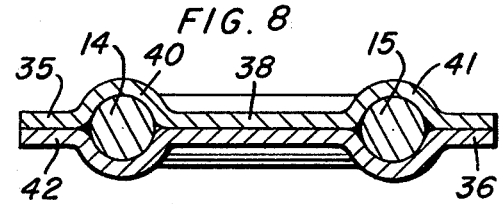
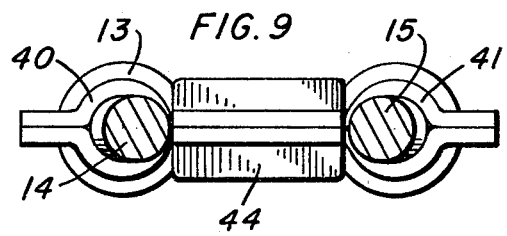

U-BOLT CLAMP

CROSS REFERENCE TO RELATED APPLICATION

This application is a continuation-in-part of application Ser. No. 868,798, filed Jan. 12, 1978, now Pat. No. 4,147,384.

BACKGROUND

The field of the present invention is the art of U-bolt saddle clamps that are employed for holding sections of tubing in telescoped connection or securing together cable sections which are generally referred to as U-bolt clamps or saddle clamps. Such devices are frequently employed in the exhaust systems of automotive vehicles powered by internal combustion engines.

The prior art directly concerned with such clamps is, for the most part, derived from a basic assembly comprising a U-bolt having a semicircular bight portion integrally connecting a pair of generally parallel legs which are threaded on their ends and which are received in axially slidable relation within a sheet steel saddle member having tubular portions receiving and housing the bolt legs and connected by a central web extending transversely between the tubular housing and integral therewith. The free threaded ends of the legs receive nuts that are tightened up against the tubular portions of the saddle member to clamp together a joint of telescoped tubes, such as for example, an exhaust joint disposed between the bight of the U-bolt and the curved edge of the saddle member.

In recent years exhaust system gas-tightness and mechanical security requirements have been amplified by governmental pollutant standards, stimulating the development of stronger and more effective clamp designs.

One widely used U-bolt clamp proven capable of dealing with present industry requirements in millions of automotive and truck installations, is noted in Heckethorn U.S. Pat. No. 3,955,250. An equally effective, lighter duty clamp is exemplified by pending Heckethorn application Ser. No. 796,217, filed May 12, 1977. The above clamps are currently produced in sizes 1.5 inches through 6.0 inches.

A new requirement has recently developed in the automotive industry for joining and sealing very small stainless steel tubing, used for exhaust gas recirculation and exhaust gas air injection systems.

Prior art U-bolt clamps made in accordance with Heckethorn U.S. Pat. No. 3,955,250 are, of necessity, larger in diameter than the tubing to which they are applied. When tightened sufficiently to form a gas-tight locking bead, the tubing is somewhat out of round. On tubing joints within the normal 1.5 inch to 6.0 inch range this out of roundness is of little concern. On very small tubing joints of, for instance $\frac{7}{8}$ inch diameter, the out of roundness is both noticeable and harmful from a gas flow and leakage standpoint.

The U-bolt clamp of the parent application and the present invention has an internal diameter substantially smaller than the outside diameter of the tubing joint to which it is applied. An extremely uniform bead is formed 360° about the joint, assuring nearly perfect roundness, gas tightness and mechanical security. The saddle portion of the clamp is reinforced preferably to prevent web twist to give greater strength and stability, as in my copending application Ser. No. 796,217.

While the clamp of the parent application works well, the present improvement results in additional economies in the manufacturing process and avoids problems of excessive indentation of the pipe sections due to improper nut tightening. The new U-bolt design incorporated herein with the identical saddle portion of the parent application permits the use of high carbon steel rod.

The invention herein consists in the novel design of the U-bolt portion for use with the saddle member of the parent application to permit the coupling together of pipe members having an outside diameter that is actually larger than the internal diameter of the assembled and closed U-bolt clamp.

OBJECTS OF THE INVENTION

The present invention has for a principal object the provision of an improved U-bolt clamp means usable with telescoped tubes or pipe sections which may be drawn into sealing engagement with a pipe having an outer diameter greater than the internal diameter of the finally assembled clamp.

Another object of the invention is to provide a U-bolt clamp arrangement which will provide leak-tight sealing engagement by means of accurate bead indentation throughout the circumference of the tubing.

It is another object of the invention to provide a U-bolt and saddle construction for joining together in telescoping relation, relatively thick walled tubing by providing uniform circular contact areas on the specially designed U-bolt and saddle member and which clamp can be installed with conventional hand tools if desired.

Yet another object of the invention is the provision of a U-bolt saddle clamp means which may be economically manufactured in large quantities from sheet metal and rod stock, which is simple and safe in use and which can be used to secure the exhaust recirculating tubes and converter air injector tubes in modern vehicles.

Another object is to provide a novel U-bolt for a clamp assembly which obviates the necessity of coining operations and which includes cam or taper portions to deform the pipe wall during tightening.

Further objects and advantages are within the scope of the present invention and numerous other features will be apparent from a consideration of the specification and drawings.

DESCRIPTION OF THE DRAWINGS

FIG. 4 is a front elevation of the clamp assembly in the pipe-receiving or loading position;

FIG. 5 is a front elevation of the clamp in the confining position during initial tightening of the nuts;

FIG. 6 is a front elevation of my clamp in the tightened final position of assembly;

FIG. 7 is a sectional view taken along the line 7—7 of FIG. 4 with the pipe removed;

FIG. 8 is a cross section taken along the line 8—8 of FIG. 4 with the pipe removed;

FIG. 9 is a cross section through the U-bolt along the line 9—9 of FIG. 4 with the pipe removed.

DETAILED DESCRIPTION

Figure 1:
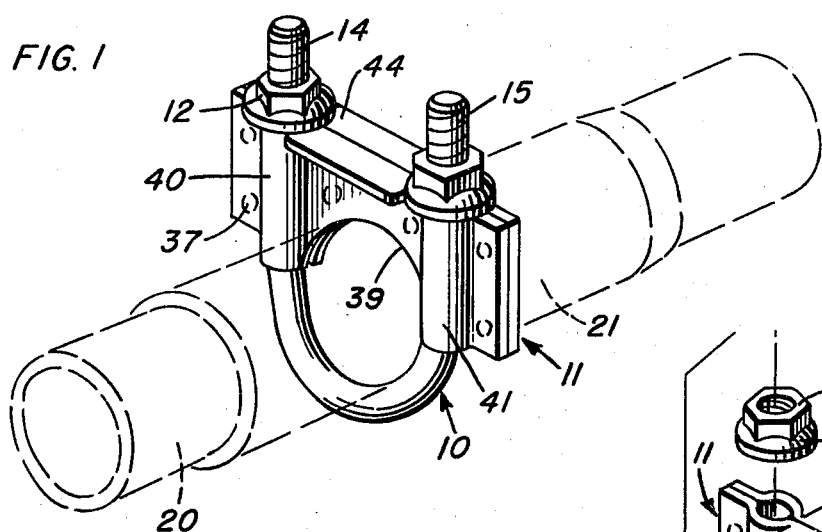
FIG. 1 is a perspective view of my new U-bolt clamp shown in assembled condition with a typical exhaust pipe connection shown in dotted lines.
Figure 2:
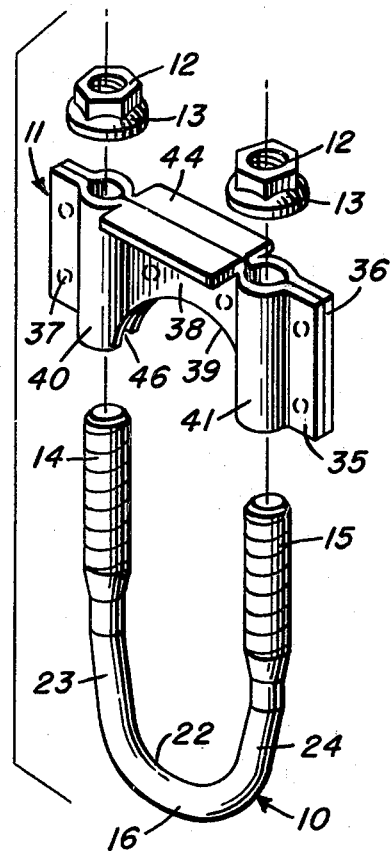
FIG. 2 is an exploded perspective of the components of the new clamp.

The invention herein disclosed is an assembly of four separate parts: a special U-bolt 10, a saddle member 11, and two securing nuts 12 having preferably integral washer portions 13. The nuts 12 are threaded on the free ends of the legs 14 and 15 which extend in generally parallel relation from the bight 16 of the U-bolt 10.

Figure 10:
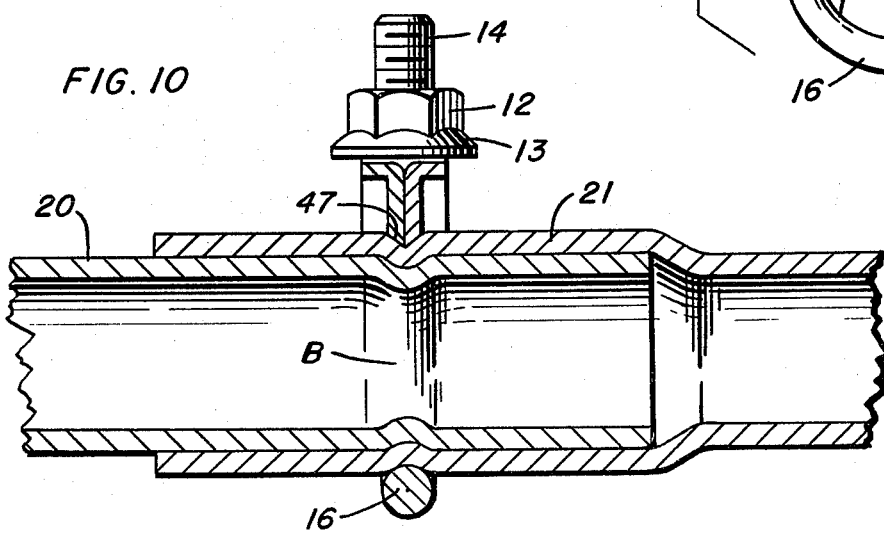
FIG. 10 is a vertical cross section showing the clamp assembled on a pair of joined tubular pipe members.

It will be noted that the saddle member 11 is slidable axially on the legs 14 and 15 between the securing nuts and the bight 16 of the bolt. In operation, a coupling of telescoped tubular members such as shown at 20 and 21 in FIGS. 1 and 10 is compressed between the saddle and the bight portions of the U-bolt when the saddle is moved toward the bight under the force of the nuts 12 as they are drawn up on the legs 14 and 15.

The bight portion 16 of U-bolt 10 is specially formed and differs from that of the parent application as can best be seen in FIGS. 1 through 7. The improved U-bolt is preferably roll formed over a shaped mandrel to provide a small confining radius portion 22 which conforms to the curvature of the tubing joint but is ideally of slightly smaller radius. It is important that this radius portion have no flat areas or other surface irregularities especially on the inner face. A short outwardly tapered section 23,24 both of equal length extends from each terminus of the radius portion terminating into the two straight threaded legs 14 and 15. The angles α between the vertical axis and the tapered sections 23,24 are equal and are fairly critical and must be calculated for each size of clamp.

In the illustrative embodiment of the invention, the clamp is specifically designed to have a closed diameter of 19 mm. With this arrangement a tubing joint of about 21 mm in diameter will freely enter the clamp in its open or loading position. The U-bolt for this application can be formed of C-1039 steel rod or other rod of high strength and may have a leg spacing from center to center of 27.1 mm. The radius of the confining radius portion would be 9.5 mm. The rod stock from which the U-bolt is formed is in this instance 5.25 mm.

Figure 3:
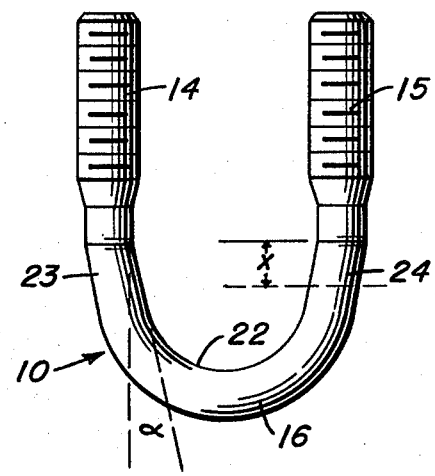
FIG. 3 is a plan view of the new U-bolt portion.

The portion of the tapered sections 23,24 designated as X in FIG. 3 taken from the center of the radius extended to the terminus of the tapered section is designated as the cam section and would have a length of 6.35 mm.

It should be noted that the new U-bolt is not limited to low carbon easy to form steels since no coining operation is required which causes rod weakening.

The saddle member 11 is preferably constructed in the embodiment shown and disclosed from initially planar thin oblong sheet steel blanks of 15 gauge 950X steel strip. The saddle member is constituted of two such blanks 35 and 36 which are projection welded together as at 37 as an integral body unit, although as an alternative embodiment the saddle member can be formed of a single blank doubled upon itself somewhat in the manner taught in my prior U.S. Pat. No. 3,955,250.

The saddle member 11 includes a central web portion 38 having a cut-out area greater than a semicircle as shown at 39. At either end of the portion 38 are tubular U-bolt receiving portions 40 and 41. A flat tab portion 42 extends on one side of the tubular portion. Reinforcing flange means 44 may be provided extending normally to each of the blanks 35 and 36. These flanges serve to greatly reinforce the web portions against distortion and roll-over when under the force generated by high level torque incident to tightening of a clamp in which the saddle is employed in service. The flange is not essential to all forms of the invention, but is shown in the preferred embodiment.

As will best be seen in FIG. 5, the cut-out portion 39 is provided with an angled, tapered, or chamfered cut away portion 45 extending at an angle of approximately 15° from the vertical. The exact angle is not critical and a fairly broad range of angles is contemplated. It is also contemplated that a curve as well as a straight chamfer may be used. This permits clearance necessary for reception of the coupled pipe joint, and provides a cam action upon the tubing joint when pretightening. As will be noted in FIG. 2, the blank portions 35 and 36 have a tapered slot shown at 46 adjacent the 15° angled portion. This slot permits entry therein of the tapered portion 23 or 24 of the U-bolt so that during a tightening sequence the tapered portion will partially enter into the slot and upon application of tightening force on the nut members will wedge therein. This cut away slot is also shown in FIG. 7.

The inner face of the cut-out 39 is beveled or tapered as at 47 (FIG. 10) in order to form a narrow groove or bead when the saddle is secured on a pipe joint. Such groove or bead is shown in FIG. 10 at B and by virtue of the tapered portions 23,24 and the beveled portion 47 extends completely about the joint for 360°. The bead formed is somewhat more uniform than that of U.S. Pat. No. 4,147,384 and is not quite as deep yet provides equal or superior gas tightness.

The manner of operation of the device and insertion over a telescopic joint connection is shown in FIGS. 4-6. In FIG. 4, the nuts 12 are preassembled on the far ends of the threaded portions 14 and 15, and the saddle member 11 has been raised upwardly to its maximum extent. In this position the assembled pipe connection 20 and 21 can be freely received within the widest portion of the assembled clamp. Application of torque to the nuts 12 will cause the cam area of tapered portion 23,24 of the U-bolt to be drawn into the opening 46 and the pipe will be drawn into an ovaled configuration as shown in FIG. 5. This position is known as the confining position. Note that the cam area of the tapered portion 23,24 cam or wedge the sides of the tubing during tightening in a progressive manner.

Continued application of torque to the nuts 12 will result in the final closed configuration of FIG. 6 wherein it will be seen the pipe connection has substantially returned to its circular shape and is now provided with an indentation or groove B which is shown in FIG. 10 and in dotted lines in FIG. 6. This extremely uniform bead B formed by the clamp provides high resistance to both longitudinal and rotational forces and ensures gas tightness. Even with deep weld seams, the leakage is usually 0.5 cubic feet/hour at 15 psi. The depth of the bead B is controlled by proper selection of the inside radius. Over-compression in certain areas is also avoided.

It will thus be seen that my new clamp, which is designed to fit a tubing joint actually larger than itself and to withstand rather significant torque, fully meets the automotive industry requirements for the new gas circulation tubing requirements. The new construction overcomes numerous problems in the prior art and yet is less costly to produce than even the clamp of the parent application and uses less materials than the earlier fastening devices heretofore available.

I claim:

1. In a clamp for sealing and interlocking a pair of telescoped metal tubes to each other, said clamp comprising a U-bolt portion and a saddle member having a pair of U-bolt leg-receiving tubular parallel housings, said saddle member formed of a pair of substantially identical planar sheet metal webs welded together in face-to-face contact and having an arcuate cut-out portion of less than 180° extending between said tubular housings, the ends of the cut-out portion being chamfered outwardly to provide a large mouth opening, said cut-out portion having a relatively sharp edge; the improvement comprising said U-bolt portion having an arcuate bight portion having a radius the same as said arcuate cut-out portion of said saddle member and extending for less than 180°, short, cam portions of equal length and divergence angle extending from the ends of said bight portion and outwardly diverging therefrom, and parallel legs extending from the ends of said cam portions received in said tubular housings, said legs being threaded for reception of nut means, wherein a pair of telescoped tubes having an outside diameter that is greater than the inside diameter of the clamp when completely tightened about the tubes may be received by virtue of the opening between the U-bolt legs and the chamfered ends of the cut-out portion, said sharp edge of the cut-out portion and the inner surface of said bight portion cooperating when the clamp is in its completely tightened condition to form a continuously uniform circumferential bead on said telescoped tubes, due to progressive deformation of any areas not in contact with either said bight portion or sharp edge.

2. A clamp as defined in claim 1 wherein the U-bolt portion is fabricated from high-strength rod.

3. A clamp as defined in claim 1 wherein the radius of the arcuate bight portion is less than the radius of the tubes to be clamped.

* * * * *